Dec. 1, 1942.  E. G. MOODY  2,303,378

FLOAT CONTROLLED BYPASS

Filed Aug. 7, 1939  4 Sheets-Sheet 1

Inventor
Edward G. Moody
by Robert P. Outerbridge
his Attorney

Dec. 1, 1942.  E. G. MOODY  2,303,378
FLOAT CONTROLLED BYPASS
Filed Aug. 7, 1939  4 Sheets-Sheet 2
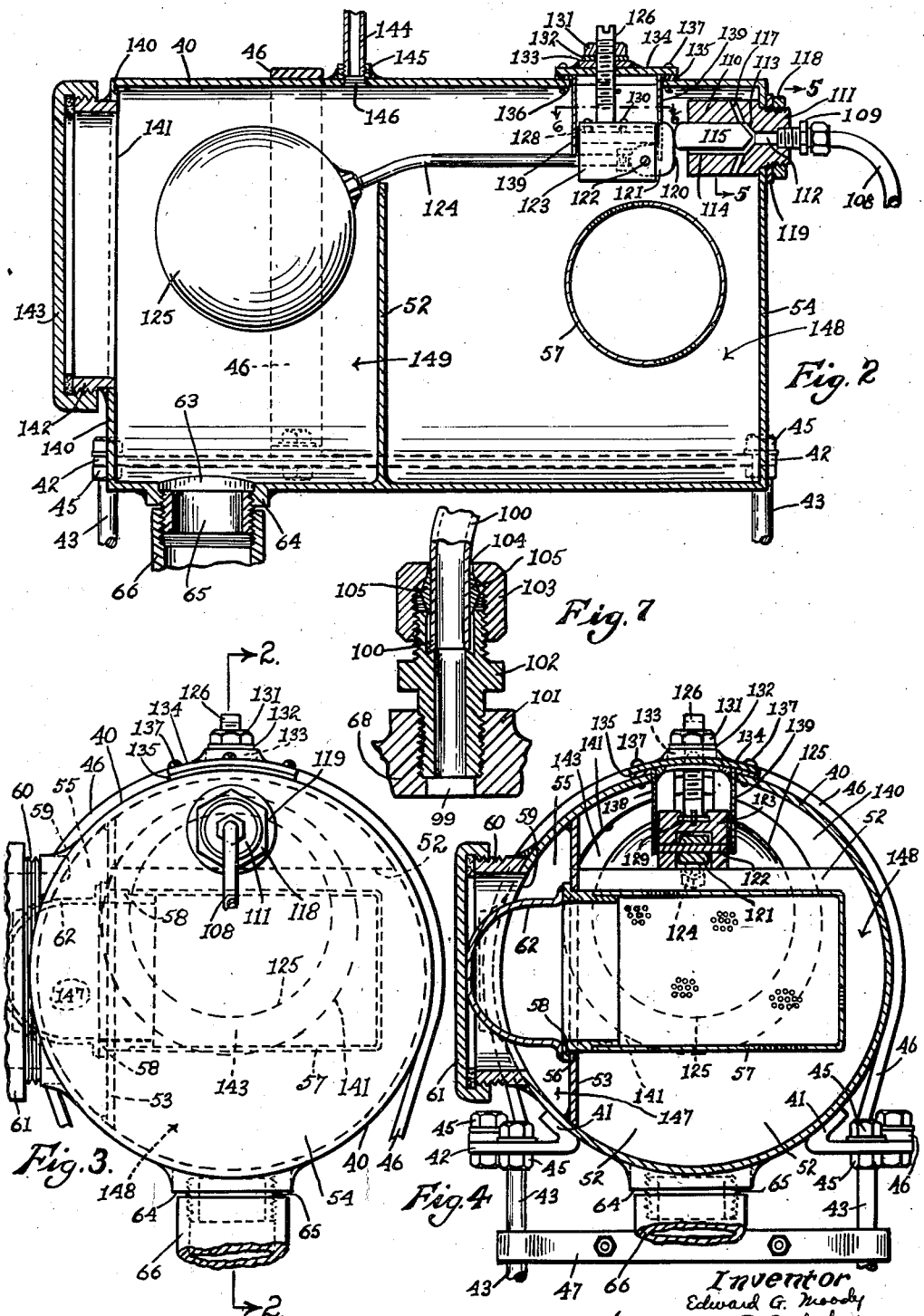

Dec. 1, 1942.   E. G. MOODY   2,303,378
FLOAT CONTROLLED BYPASS
Filed Aug. 7, 1939   4 Sheets-Sheet 3

Inventor
Edward G. Moody
by Robert P. Outerbridge
his Attorney

Dec. 1, 1942.  E. G. MOODY  2,303,378
FLOAT CONTROLLED BYPASS
Filed Aug. 7, 1939  4 Sheets-Sheet 4

Inventor
Edward G. Moody
by Robert P. Outerbridge
his Attorney

Patented Dec. 1, 1942

2,303,378

UNITED STATES PATENT OFFICE 2,303,378

FLOAT CONTROLLED BYPASS

Edward G. Moody, Lynn, Mass.

Application August 7, 1939, Serial No. 288,835

20 Claims. (Cl. 103—40)

The present invention relates to devices for insuring that liquid material pumped or gravitationally passed to a dispensing device is, within a tolerance limit, free from froth or foam, air, or vapor from the liquid at the point of delivery. More particularly, the present invention relates to devices of such nature that where liquid is to pass through a measuring apparatus such as a meter, the devices prevent, within a tolerance limit, the froth or foam, air, or vapor from reaching the meter along with the liquid, thereby insuring that the reading on the meter is accurate, i. e., insuring that the meter will not register as liquid the froth or foam, air, or vapor that would otherwise pass through the meter and cause it to register inaccurately.

The above-indicated problem of accurate metering is an old one and arises whenever a quantity of liquid is to be measured during dispensing, i. e., while passing to a point of discharge. There are many industrial or commercial operations which, broadly speaking, involve metering a liquid under such conditions. Perhaps the most widely recognized example is the oil industry, for products such as crude oil, fuel oil, range oil, kerosene, gasoline, to mention but a few, are transferred into and out of tanks or containers of many sorts; and during transfer the products are metered so that the amount transferred can be readily known. The containers themselves may be bulk plant tanks into which oil products are introduced for latter removal, or the containers may be one or more of the compartments of the well known tank trucks which deliver oil products to filling stations, buildings, and the like. Other products which are measured while being transferred from one locus to another are milk, liquid soap, ingredients for making soap, ingredients for making paint, also syrups, vinegar, vegetable oils, and fruit and vegetable juices now so much in the forefront of public consumption. Still another example, and this by no means exhausts the list, is chocolate manufacture, for rather than weigh a huge quantity of chocolate in bulk, it is customary for large manufacturers to melt the chocolate and pass it through a meter registering in terms of weight. On all these operations the particular liquid is caused to pass through a meter either by means of a pump or by force of gravity, when the meter is below the liquid, but on this last a pump may be needed if the discharge point is above the level of the surface of the liquid or above some point therebelow short of its bottom level, and pumps are also used to give a flow rate that is faster than a gravitational one or to maintain an even rate of flow.

While the problem to which the present invention relates may be illustrated as it appears in handling any one of a variety of liquids, it is preferred to illustrate it for the most part herein as found in the oil industry, specifically as the problem appears in dispensing oil products from a tank truck. In such trucks it is well known that there are one or more compartments each of which is connected by means of a conduit to a manifold which in turn leads to the intake portion of a pump, usually of the rotary type. A device, for insuring that within a tolerance limit only liquid reaches the meter, is connected to the outlet or pressure side of the pump, and additional portions of the "line" include the meter, a dispensing hose and nozzle, and shut-off valves associated with the tank conduits and the manifold.

The devices employed for insuring that within a tolerance limit only liquid reaches the meter are required by governmental regulations for protection against short delivery, unintentional or fraudulent, and the reason for this is that if air or vapor is allowed to reach the pump, a churning action is set up which causes a certain amount or air or vapor from the liquid to be mixed with the liquid, and the result is what may be called a froth or foam. This result can be brought about unintentionally by mere inadvertent failure to close the shut-off valve in the conduit leading to any empty tank compartment while the pump is drawing liquid from another compartment, but this same result can also be very intentionally brought about for fraudulent purposes, when one or more of the tank compartments are empty, by deliberately opening their associated shut-off valves while the pump is drawing liquid from another compartment. The result is in each case the same, namely, the drawing of air or vapor from one or more of the empty compartments and the drawing of liquid from another, and then the pumping of this mixture into the "line" towards its discharge end. The froth or foam thus produced passes through the meter and is registered as true liquid, with the result that upon settling the total liquid discharged is very appreciably less than the amount recorded on the meter.

The devices now in general use for preventing the above undesirable results are known to the trade as "air releases" or "air eliminators," and are characterized in general by a chamber which receives the liquid and froth and air, a vent at the chamber top, a vertically movable valve for closing the vent, a delicately adjusted linkage mechanism, a float connected to the valve by the linkage mechanism, and an outlet from the chamber leading to the meter. These devices have a number of defects, among which are the points that very often the internal mechanism gets out of order by reason of its very construction, thereby necessitating unsealing the device from the "line" by an inspector, repairs, and then testing and resealing by the inspector; that the air pressure in the chamber above the surface of the liquid tends to force the valve to closed position, thereby preventing further venting and causing the building up of more valve-closing pressure; and that the float tends to be buoyed up by the froth, thus positively closing the valve and so also preventing further venting of froth or foam and air which of necessity therefore passes to and through the meter and is registered as liquid.

So long as it is necessary or desirable to measure a quantity of liquid being transferred under conditions where froth or foam and air or vapor are or can be mixed with the liquid and are measured as liquid, some device is necessary for preventing such a mixture, within a tolerance limit, from reaching the meter. Some such device is also necessary under the above conditions even where no meter is used, the desideratum being merely to deliver liquid unmixed with froth or foam, air, or vapor as stated. As the present "air releases" and "air eliminators" are for reasons such as stated above undesirable to use for these purposes, even at normal pump pressures, it is the principal object of the present invention to produce apparatus which achieves the result intended to be achieved by "air releases" and "air eliminators" but which renders such devices unnecessary by reason of different structure operating more efficiently and upon a different principle.

To the accomplishment of this object, and of such others as may appear hereinafter the various features of the present invention reside in certain constructions, combinations, and arrangements of parts particular embodiments of which are fully described hereinafter and illustrated in the accompanying drawings, the said features being set forth broadly and in their true scope in the appended claims by the intentional use of generic terms that are inclusive of various modifications.

The various features of the present invention will be readily understood from inspection of this specification in the light of the accompanying drawings, illustrating the best embodiments of the invention at present known to the inventor and in which:

Fig. 2 is a view in front sectional elevation of the float chamber and associated parts, taken generally along the line 2—2 of Fig. 3;

Fig. 3 is a view in right side elevation of the float chamber and associated parts, the float being down, i. e., in valve open position, as in Fig. 2;

Fig. 4 is a view in right side sectional elevation of the float chamber and associated parts, taken generally along the line 4—4 of Fig. 1 but showing the float down as in Figs. 2 and 3;

Fig. 7 is an enlarged detail view in sectional elevation taken along the line 7—7 of Fig. 1;

Figure 1:
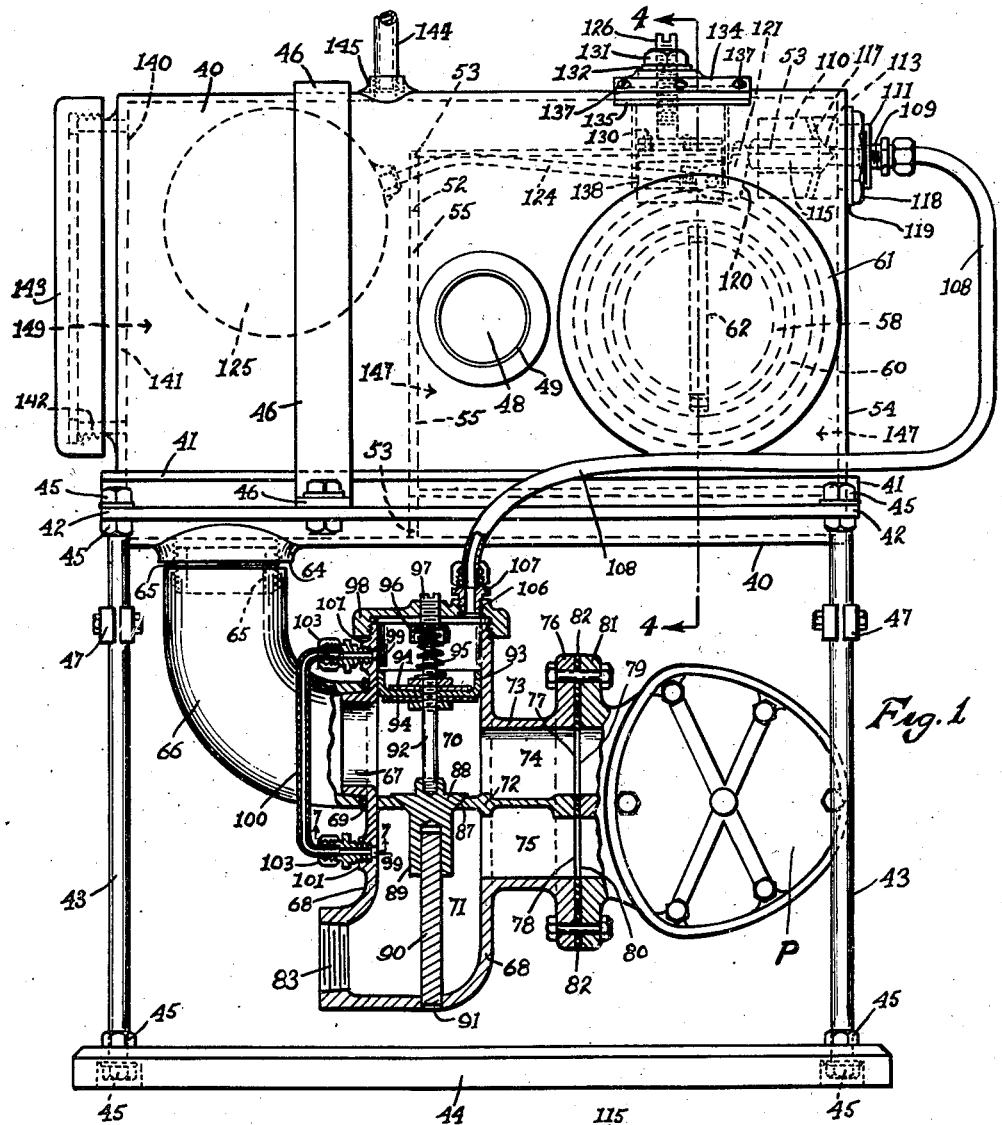
Figure 1 is a view in elevation, partially in section, showing the by-pass construction as a whole associated with the pumping end of a rotary pump, the float being up, i. e., in valve closing position.
Figure 8:
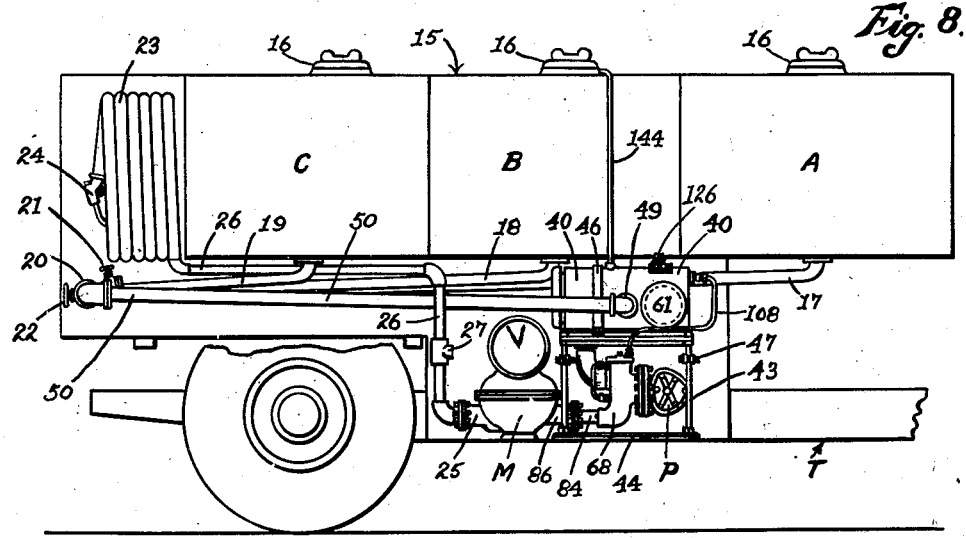
Fig. 8 is a view in right side elevation of a tank truck, certain truck parts not appearing, showing the mounting of the by-pass construction as a whole at the side of the truck.
Figure 9:
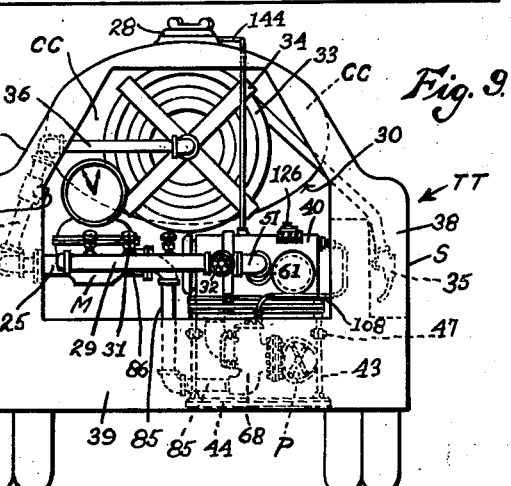
Fig. 9 is a view in rear elevation of a tank truck showing the mounting of the by-pass construction as a whole at the rear of the truck.
Figure 10:
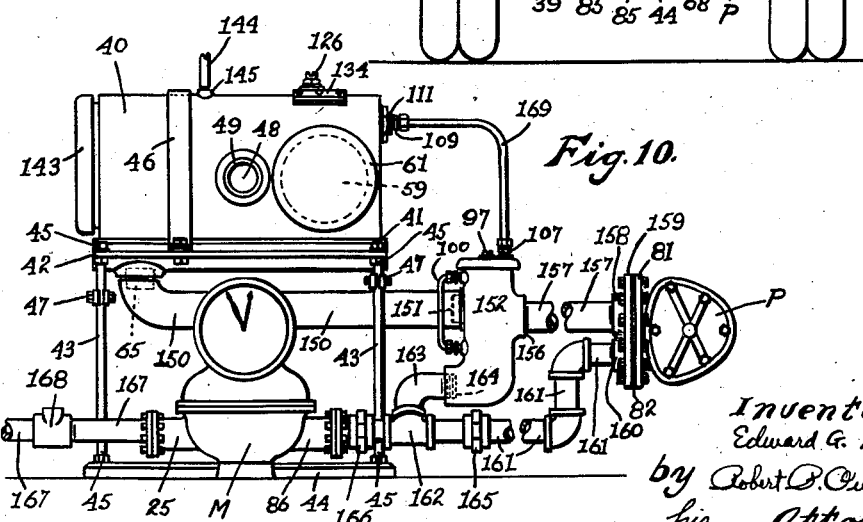
Fig. 10 is a view in front elevation, in reduced scale as compared to Fig. 1, showing a different form of the by-pass construction as a whole adapted either for use in connection with a pump that is already in a given position and is intended to remain there, or for use under conditions where the Fig. 1 arrangement is impracticable or inconvenient.
Figure 11:
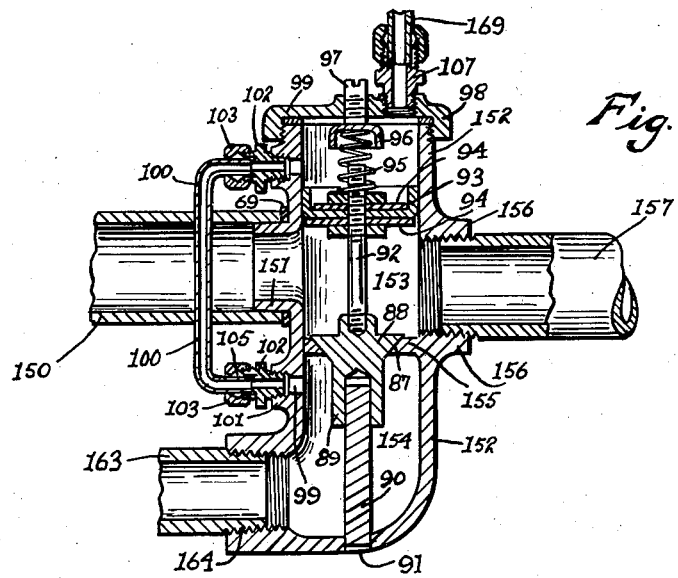
Figure 12:
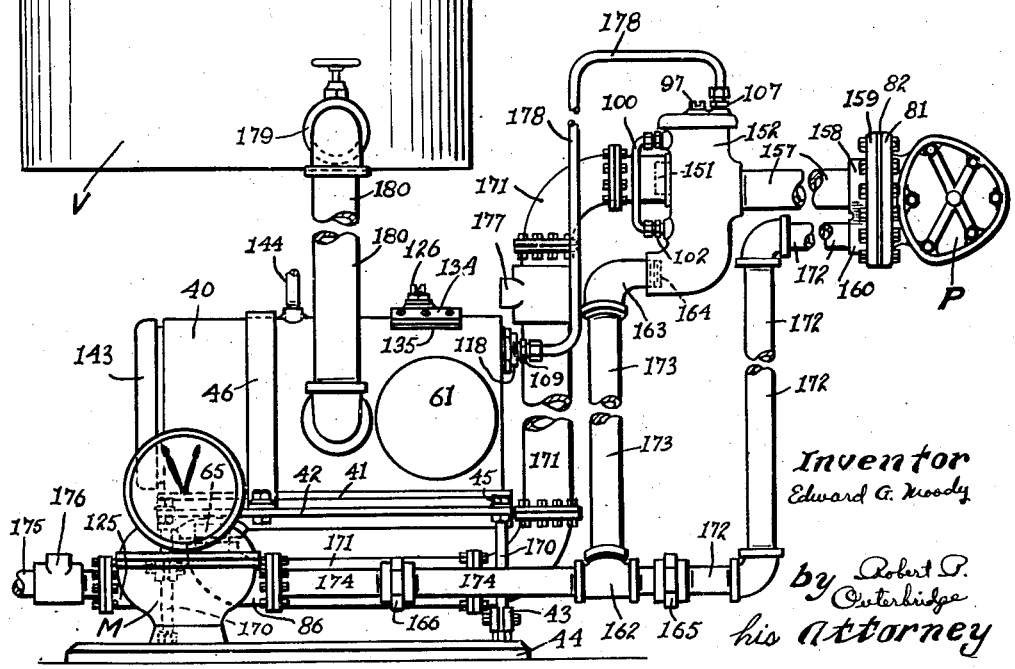

Fig. 11 is a view in sectional elevation of the by-pass casing and associated parts, of the type shown in Figs. 10 and 12 as compared to the type shown in Figs. 1, 8, and 9; and Fig. 12 is a view in front elevation, in reduced scale as compared to Fig. 1, showing the by-pass construction as a whole adapted for use with a stationary vat or tank (bulk plant) as the source of liquid, and also showing the by-pass casing at a level above the top of the float chamber.

Referring to the drawings, there are shown in Fig. 8 certain portions of a tank truck T which may be considered as representative of tank trucks in general where the metering and pumping apparatus is located at one side thereof. For convenience of disclosure only, the tank portion 15 is shown as having three internal compartments A, B, and C, each provided with the usual vented closure 16 for a filler opening. The three compartments are provided at their bottoms with conduits 17, 18, and 19, respectively, extending into a transverse manifold 20 located at the rear of the truck. Each of these conduits is provided with a shut-off valve 21 just ahead of the manifold 20, and the manifold itself is provided with the usual shut-off valve 22. The rear of the truck T is provided with the usual hose 23 to the free end of which is attached a suitable discharge nozzle 24, and the truck T is also provided with a preferably rotary pump P, only the pumping end of which is shown in the drawings since any pump of present make which is proper for the purpose may be used. Suitably supported from the truck, for example, is a meter M, and leading from the left (Fig. 8) or outlet end 25 of the meter is a conduit 26 suitably connected to the inner end of the hose 23. A preferably spring-controlled check valve 27 of usual construction and of about ten pounds resistance forms a portion of the conduit 26, and while the valve 27 is shown beyond the meter M, it is contemplated that the valve may be located ahead of it, a well known practice. The foregoing structural elements are all old and in one position or another are standard parts of tank trucks now in general use.

Fig. 9 shows a somewhat different tank truck structure, although all the parts of it, as in Fig. 8, are old. Briefly the Fig. 9 tank truck TT is provided with an outer shell or casing S in part covering the tank compartments, the rear one of which, CC, is shown provided with a closure 28 like the closure 16, and the transverse manifold 29 does not extend as far across the rear of the structure as may the manifold 20 in Fig. 8. It will be understood that the compartments in the tank portion 30 of the truck TT are provided at their bottoms with conduits (not shown) corresponding to the conduits 17, 18, and 19 in Fig. 8, and that each of these conduits is provided with a shut-off valve 31 located just ahead of the manifold 29, having a shut-off valve 32, as is the case in the Fig. 8 structure. There is also provided the preferably rotary pump P, and a hose 33 is wound around a reel 34 and provided with a nozzle 35 which may be like the nozzle 24. Leading from the left (Fig. 9) or outlet end 25 of the meter M is a conduit 36, corresponding to the conduit 26 in function, which is provided with a preferably spring-controlled check valve 37 like the valve 27, and the conduit 36 is operatively connected in the usual manner to the inner end of the hose 33. As is the case of the check valve 27 in Fig. 8, the check valve 37 may be located beyond the meter M, as shown, or may be located ahead of it. The casing S is provided at its rear with wall portions 38 which terminate downwardly in an apron 39. The usual doors which ordinarily cover the hose 33, manifold 29, and associated parts shown exposed, are not illustrated. In both Figs. 8 and 9 the pump P may be driven through suitable connections from the power plant of the truck, as is common practice, or the pump P may be driven by a separate internal combustion engine, for example, mounted on the truck, this latter arrangement permitting the power plant or main engine to be out of operation while the liquid is being dispensed, and so making a saving in operating costs.

The foregoing remarks about old structures are made to show two loci for an embodiment of the present invention, which will now be described in connection therewith.

Referring to Figs. 1–4 in particular, and also to Figs. 8 and 9, the illustrated embodiments of the present invention contemplate in part the provision of a preferably cylindrical chamber 40 which, to give one example of mounting, may be longitudinally supported upon the upwardly and out-turned wings 41 of horizontal strips 42 the opposite ends of which receive the upper ends of vertical rods 43, the lower ends of these rods terminating in a platform 44. The upper ends of the rods 43 are secured to the strips 42 by opposed pairs of nuts 45, and like pairs of nuts secure the lower ends of the rods to the platform 44, the lower portion of which may be countersunk (Fig. 1) to receive the lowermost nuts. The chamber 40 may be held in place on the wings 41 by means of a strap 46 the opposite ends of which are out-turned (Fig. 4) so that they may rest flatwise on the horizontal strips 42 and may be firmly secured thereto as indicated. In order to brace the chamber-supporting structure above described, the pairs of rods 43 at the opposite ends of the chamber 40 may each be provided with a split clamp 47.

It is intended that the chamber 40 receive liquid from any of the tank compartments of the trucks T or TT. To this end the chamber 40 is provided with a front inlet opening 48 (Fig. 1) about which an outwardly extending collar 49 may be suitably secured, as by brazing, and the collar is connected to a conduit 50 (Fig. 8) leading from the delivery end of the manifold 20, or to a conduit 51 (Fig. 9) leading from the delivery end of the manifold 29, thereby providing in each case a conduit arrangement or "line" from the tank compartments to the chamber 40.

Internally the chamber 40 is provided in part with a transverse partition 52 (Figs. 1–4) terminating short of the top of the chamber and extending from the rear curved wall thereof (Figs. 3 and 4) forwardly to a point spaced from the longitudinal center of the front curved wall. Joined to the vertical front edge of the partition 52 so as to be also spaced from the longitudinal center of the front curved wall of the chamber 40 is the long leg 53 (Figs. 1, 3, and 4) of an L-shaped partition, the left (Fig. 1) end of the leg 53 extending from the partition 52 to the right wall 54 of the chamber 40, to which the leg 53 is secured, as it is along its upper and lower edges to the front curved wall of the chamber 40 (Figs. 3 and 4). The short leg 55 of the L-shaped partition extends forwardly of the front edge of the partition 52 and is provided with a front curved edge (Figs. 3 and 4) secured to the front curved wall of the chamber 40. The partition leg 53 is provided with an opening 56 (Fig. 4) which slidably receives a strainer 57 shown as secured to a cylindrical member having a front flange 58 adapted to abut the partition leg 53 about the opening 56, and to permit the insertion and removal of the strainer 57 the chamber 40 is provided with a front opening 59 (Figs. 3 and 4) to which an outwardly extending collar 60 is suitably secured. A cover 61 carrying a gasket is threaded on the collar 60, and the strainer 57 is held in place by reason of the cover 61 pressing on a spring bail 62 attached to the flange 58 (Figs. 1, 3, and 4), thereby causing the flange 58 to abut the partition 53. To provide an outlet from the chamber 40 an opening 63 (Fig. 2) is formed in the bottom thereof to the left (Fig. 2) of the transverse partition 52, and a suitably secured collar 64 (Figs. 1–4) extends outwardly and downwardly from the chamber about the opening 63.

While in the illustrated embodiments of the present invention it is contemplated in part that the liquid from the tank compartments should not pass directly from the conduits 50 or 51 to the pump P but should first flow through the chamber 40, in the illustrated embodiments of the present invention it is also contemplated in part that the liquid from the chamber 40 should not pass directly to the pump but should first pass to further structure forming a feature of the present invention, this further structure being herein illustrated merely for disclosure purposes as a casing unit.

To this latter end the collar 64 may be provided interiorly with a nipple 65 (Figs. 1–4) to which one end of a conduit 66 is threaded, the other end of the conduit being shrunk, for example, onto a hollow annular inlet collar 67 (Fig. 1) outstanding from a by-pass casing 68 (Figs. 1, 8 and 9) and provided with a gasket 69 which the end of the conduit abuts. With particular reference to Fig. 1, the illustrated by-pass casing 68 is divided into upper and lower chambers 70 and 71, respectively, by a transverse partition 72 preferably located slightly below the level of the bottom of the collar 67 and extending through the casing and also through a preferably integral and hollow boss 73 outstanding to the right (Fig. 1) of the casing, thereby dividing the boss 73 into upper and lower chambers 74 and 75, respectively, which thus form continuations of the upper and lower casing chambers 70 and 71. The free ends of the boss 73 and the partition 72 comprise an integral and vertical flat plate 76 having upper and lower openings 77 and 78 adapted to register with the intake opening 79 and the pressure or outlet opening 80, respectively, formed in a vertical plate 81 constituting part of the pumping end of the pump P. The plates 76 and 81 are bolted together, and an apertured gasket 82 is interposed therebetween. The upper openings 77 and 79 are preferably larger than the lower openings 78 and 80, as shown in Fig. 1, although these openings may all be of equal size, depending on the type of commercial pump utilized, and the lower end of the casing 68 is bent to the left (Fig. 1) and is provided with an outlet 83 to which one end of a conduit 84 (Fig. 8) or 85 (Fig. 9) is connected, the other end of either of these conduits being connected to the intake end 86 of the meter M as shown in Figs. 8 and 9.

As a matter of further structure associated with the illustrated by-pass casing 68, the partition 72 is provided beneath the top of the casing with a frusto-conical seat 87 (Fig. 1) adapted to receive a vertically movable frusto-conical valve member 88 for closing purposes on downward movement. The valve member 88 is provided with a hollow vertically depending and cylindrical stem 89 which receives a vertical guide rod 90 extending upwardly from an opening 91 at the bottom of the casing 68 and there preferably shrunk into position. Threaded into a boss at the top of the valve member 88 is a vertical piston rod 92 to the upper portion of which there is secured by means of nuts a piston comprising an upstanding cup 93 and washers 94 engaging the nuts and the opposite faces of the bottom of the piston cup, respectively. It will be noted that the diameter of the by-pass casing 68, i. e., the diameter of the piston cup 93, is appreciably greater than the greatest diameter of the frusto-conical seat 87. A portion of the rod 92 extends above the piston cup 93 and serves as a guide for a very weak coil spring 95, the lower end of which abuts the upper piston cup washer 94 and the upper end of which is received in a depending cup 96. This cup is secured to the bottom of a screw 97 mounted in a cover 98 for the top of the casing 68, the cover being provided with a gasket, and the screw 97 extends through and above the cover top to permit an external adjusting of the screw so that the tension of the spring 95 may be varied from substantially zero up to maintain the valve member 88 normally closed in the seat 87 but capable of ready elevation, i. e., opening, to place the upper and lower chambers 70 and 71 of the by-pass casing 68 in communication below the piston cup 93.

It is intended that a permanent communication be provided between the upper and lower chambers 70 and 71 above the piston cup 93, and to this end (Fig. 1) the outer wall of each chamber is provided with an opening 99, the upper opening being above the piston cup 93 as the valve member 88 is in its seated position (Fig. 1), and leading to the openings 99 are the opposite bent ends, respectively, of a relatively small diametered tube 100. In order to hold each tube end portion in registry with its associated chamber opening 99 any suitable construction may be used, but for purposes of disclosure only a well known means is shown in best detail in Fig. 7. The wall of the casing 68 is provided with a pair of bosses 101 (Fig. 1) each having a passage forming a continuation of the associated opening 99, and (Fig. 7) into each boss 101 there is threaded one end of a hollow adapter 102, the opposite end of which threadedly receives a collar 103 having a restricted top opening 104 substantially the same in diameter as the exterior of the tube 100. Each tube end portion passes through its collar top opening 104 and into its adapter 102, and upon turning a collar 103 on its adapter a soft ferrule 105, surrounding the tube end portion and interposed between the under face of the top of the collar 103 and the top of the adapter 102, becomes distorted so as to fill the space between the tube 100 and the interior of the collar 103, thereby not only sealing the joint but also holding the end of the tube in place. By reason of the tube 100 and associated parts the by-pass casing chambers 70 and 71 are thus always in communication above the piston cup 93, the reason for this arrangement being set forth hereinafter. Further by-pass casing structure includes a boss 106 on the top of the cover 98 (Fig. 1) which receives an adapter 107 corresponding to the adapter 102, and other parts corresponding to those above-described as associated with the adapter 102, for holding and sealing the lower end portion of an upwardly extending bent tube 108 having an internal diameter very appreciably greater than that of the tube 100.

Turning now to the chamber 40 for further structure associated therewith, the upper end of the tube 108 (Figs. 1-3) is secured by means of an adapter 109 and associated parts, identical with those shown for the lower end of the tube 108 in Fig. 1 and corresponding to those illustrated best in Fig. 7, to a cylinder 110 (Figs. 1, 2, and 5) having a reduced portion 111 (Figs. 1-3) extending through an opening formed at the top of the right hand wall 54 of the chamber 40. Leading from the inner end of the adapter 109 the cylinder 110 is provided with a small cylindrical passage 112 (Fig. 2) which enlarges into a frusto-conical seat 113 followed by a large cylindrical passage 114 extending inwardly through the remainder of the cylinder 110. The cylindrical passage 114 receives a needle valve member 115 having a conical point adapted to seat in the frusto-conical seat 113, and the body of the needle 115 is preferably triangular in cross section (Fig. 5), with rounded edges, so as to leave three spaces 116 between the faces of the body of the needle and the wall of the cylindrical passage 114, which spaces open to the free interior of the chamber 40. The cylinder 110 is also provided with two or more passages 117 (Figs. 1 and 2) leading from a point behind the valve seat 113 to the free interior of the chamber 40. By reason of this construction it will be seen that when the needle 115 is seated on its seat 113, as shown in Fig. 1, the valve formed thereby is completely closed but that when the needle is withdrawn from its seat (Fig. 2) anything, as will be explained later, passing from the tube 108 into the small cylindrical passage 112 will have ample entry into the chamber 40 by way of the spaces 116 and also the passages 117. The cylinder 110 is held in place by a nut 118 (Figs. 1-3) between which and the adjacent portion of the chamber wall 54 a lead washer 119 is interposed to effect a seal.

Figures 5, 6:
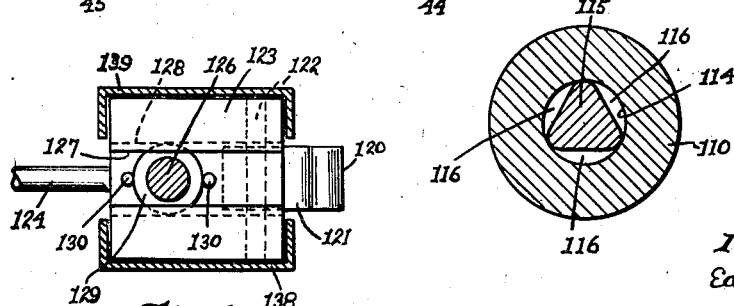
Fig. 5 is an enlarged detail view in sectional elevation, taken along the line 5—5 of Fig. 2.
Fig. 6 is an enlarged detail view in plan, partially in section, taken for clarity of disclosure along the line 6—6 of Fig. 2, but showing the cam in tipped, i. e., in valve closing, position as in Fig. 1.

The inner end of the needle 115 extends beyond the inner end of the cylinder 110, is preferably rounded, and is aligned with the cam surface 120 on a cam 121 (Figs. 1, 2, 4, and 6) pivoted by means of a pin 122 between the wings of a downwardly channeled block 123, best shown in Figs. 4 and 6. The cam 121 receives one end of a rod 124, a portion of the other end of which is downwardly bent (Figs. 1 and 2) and extends over the transverse partition 52 where it is secured to a float 125 which is sufficiently heavy so that it is not buoyed up by froth or foam but will float only in true liquid. The channeled block 123 which supports the cam 121 is in turn supported from a threaded rod 126, and to this end the top of the block 123 is provided with a longitudinal groove 127 (Figs. 4 and 6) beneath which a wider groove 128 is located in spaced relation vertically, and the wider groove 128 receives a flange 129 on the lower end of the rod 126 and supports oppositely disposed pins 130 by which the flange is held in place longitudinally of the groove, while permitting rotation of the flange and the rod. The rod 126 extends from a point exteriorly of the chamber 40 downwardly through a nut 131 (Figs. 1-4) beneath which is a lead washer 132 for sealing purposes overlying a collar 133 suitably secured to the top of a plate 134. Beneath the plate 134 is an apertured lead plate 135 which surrounds an opening 136 (Fig. 2) at the top of the chamber 40, and the plates 134 and 135 are secured to the chamber top by screws 137. By reason of this construction turning of the threaded rod 126 serves to raise or lower the cam 121 with respect to the rounded end of the needle 115, and to insure that when the rod 126 is thus turned the block 123 and the cam 121 do not turn also, channel pieces 138 and 139 (Figs. 1, 2, 4, and 6) are secured to the plate 134 and depend close to the opposite sides and end portions, respectively, of the block 123 to act as a restraining guide. This guideway function is best brought out in Figs. 4 and 6, and by this arrangement it will be seen that the cam surface 120 remains substantially aligned with the rounded end of the needle 115 regardless of the vertical position of the former.

In order to insert or remove the float 125 and the rod 124 the left (Fig. 1) wall 140 of the chamber 40 is provided with an opening 141 (Figs. 1-4) about which an outstanding collar 142 is suitably secured, and a cover 143 is threaded on the collar and is provided with a gasket to insure a seal. Completing the structure associated with the chamber 40 is a tube 144 the lower end of which is threaded into a collar 145 secured to the top of the chamber 40 over a vent opening 146 therein, and the upper end of the tube 144 leads into a filler opening closed by a vented closure 18 (Fig. 8) or 28 (Fig. 9) so that the tube 144 functions as a communication between the chamber 40 and the interior of a tank compartment.

In describing the mode of operation of the construction set forth above, let it be first assumed that the tank compartment of the trucks T or TT from which liquid is to be withdrawn is substantially full and that the shut-off valves 21 or 31 to all tank compartments are closed, as are the manifold shut-off valve 22 or 32. In order to initiate the drawing of liquid from any of the tank compartments, but taking the compartment C (Fig. 8) as an example of all of them, its associated shut-off valve 21 is opened and the shut-off valve 22 for the manifold 20 is also opened. If the pump P is not initially in operation, liquid from the compartment C will flow by gravity down the conduit 50 to the chamber 40, pushing before it any air or vapor lying ahead, whereupon this air or vapor, upon entering the chamber 40, is vented through the opening 146 and tube 144 into the tank compartment with which the upper end of the tube 144 is associated. If the pump P is already in operation when the conduit and manifold shut-off valves are opened, the pump will tend to draw air in the conduit 50 into the chamber 40, thereby accelerating venting and also accelerating the entry of liquid into the chamber 40. In either event, the liquid passes into the chamber inlet 48 and thence into the chamber portion 147 (Figs. 1, 3 and 4) bounded by the partition legs 53 and 55, the associated portion of the curved front wall of the chamber 40, and the associated portion of the right chamber wall 54. Thence the liquid passes through the strainer 57 and so into the chamber portion 148 (Figs. 2, 3 and 4) bounded by the partition leg 53, the associated portion of the right chamber wall 54, the associated portion of the rear curved chamber wall, and the transverse partition 52, and when sufficient liquid has entered this chamber portion 148, liquid will spill over the top edge of the transverse partition 52 and so enter the chamber portion 149 (Figs. 1 and 2) bounded by the transverse partition 52, the short partition leg 55, the associated portions of the front and rear curved walls of the chamber 40, and the left side wall 140 thereof. During all this operation the float 125 will be down (Fig. 2), i. e., in such position that the needle 115 is spaced or spaceable from its seat 113, but upon the continued rising of the level of the liquid in the chamber portion 149, the float 125 rises and so continues until the pivoted cam 121 is tipped from its valve-open or Fig. 2 position to its valve-closed or Fig. 1 position, since the rod 124 connects the float 125 with the cam 121, thereby closing the valve formed by the conical end of the needle 115 and the frusto-conical seat 113. The continued flow of the liquid into the chamber 40 is full or under "flooded suction" conditions, i. e., without the presence of any froth or foam, and the liquid passes from the chamber 40 through the conduit 66 to the chambers 70 and 74 of the by-pass casing 68 and then through the inlet opening 79 of the pump P, after which the liquid is forced out of the opening 80 from the pressure side or portion of the pump and passes through the casing chambers 75 and 71 and the casing outlet 83 and thence through the conduits 84 (Fig. 8) or 85 (Fig. 9) the meter M, the conduits 26 or 36 with their associated check valves 27 or 37, respectively, the hoses 23 or 33, and the nozzles 24 or 35, it being understood that the resistance of the check valves is considerably less than the normal pressure set up by the pump P. Under these circumstances the meter M of necessity registers liquid because only liquid is passing through it, and this proper registering continues so long as no air or vapor is allowed to reach the pump, one example of this being where the amount of liquid intended to be delivered is actually delivered before the tank compartment in question is empty.

In the above-described operation the "line" is completely sealed from the tank compartment in question to the discharge nozzles 24 or 35 because of the "flooded suction" condition, and this sealing is possible partially because the tube 100 connecting the upper and lower chambers 70 and 71, respectively, of the illustrated by-pass casing 68 provides that pressure in the lower by-pass casing chamber 71 is transmitted to the portion of the upper by-pass casing 70 located above the piston cup 93, thereby more than neutralizing the pressure exerted on the bottom of the piston cup 93 upwardly and on the under side of the valve member 88 upwardly, because of the greater diameter of the piston cup as compared with the greatest diameter of the valve member 88, and so preventing the pressure in the lower casing chamber 71 from pushing the valve member 88 upwardly from its seat 87 and against the resistance of the spring 95. In this manner there is prevented the breaking of the seal formed by the closed valve between the casing chambers 70 and 74 and the inlet 79 of the pump P on the one hand and the pump outlet 80, the casing chambers 75 and 71, and the casing outlet 83 on the other hand.

The above referred to partial sealing of the "line" under "flooded suction" conditions is completed by the action of the elevated float 125 tipping the cam 121 and so forcing the needle 115 against its seat 113, with the result that no liquid which may be in the pipe 108 can flow through the passages 117 in the cylinder 110 and the spaces 116 between the sides of the needle 115 and the wall of the cylindrical passage 114 and so into the vented chamber 40. In this way the tube 108 and the portion of the casing chamber 70 above the bottom of the piston cup 93 are sealed from communication with the interior of the chamber 40 and there follows as a necessary result the desired passage of only liquid through the meter M and discharge from the nozzles 24 or 35 under the action of the pump P.

The above description presupposes that the pump is producing normal pressure, but it will be appreciated that under certain conditions the pump P may set up an abnormal pressure, necessitating a release thereof. To achieve this end the float 125, the pivoted cam 121, and the needle 115 are in part relied on in the structure disclosed, and examination of Figs. 1 and 2 will show that the distance from any given point on the cam surface 120 to the fulcrum afforded by the pin 122 is much smaller than the distance from the pin 122 to the center of the float 125. By reason of this construction there is a great mechanical advantage for the float in causing the cam 121 to force the needle 115 against its seat 113 as the float rises and tips the cam 121 to its Fig. 1 position, and a great mechanical disadvantage for inward pressure exerted against the valve end of the needle 115 by liquid in the tube 108 to tip the cam 121 back to or toward its Fig. 2 position, thus forcing the float 125 down into the liquid in the chamber portion 149 and opening the valve to permit the escape of liquid from the tube 108 into the vented chamber 40 by way of the passages 117 and the spaces 116, and so providing a release of excessive pressure. The desired pressure point at which it is intended that the release shall function may vary as circumstances warrant, and it is for this reason that the cam 121 is pivoted to the channeled block 123 which can be moved vertically up or down by proper turning of the threaded rod 126. Stated in another way, the cam 121 is in such vertical position (Fig. 2) with respect to the rounded end of the needle 115 that when the needle is once tipped to its Fig. 1 position it will require a given pressure of liquid in the tube 108 against the valve end of the needle 115 to force the cam 121 back to or toward its open or Fig. 2 position, i. e., to overcome the buoying up tendency of the float 125 in the chamber portion 149 and so releasing pressure against the valve end of the needle 115. To increase the amount of pressure required of liquid in the tube 108 to achieve this result, i. e., to make it more difficult to overcome the buoying up of the float 125 by the liquid in the chamber portion 149, the rod 126 is turned to elevate the cam 121, thereby bringing its cam surface contact area with respect to the rounded end of the needle 115 nearer to the fulcrum 122, and so making the mechanical disadvantage of the cam 121 against the float 125 greater. By the same token it will be realized that when the rod 126 is turned in the opposite direction, the contact area of the cam surface 120 with respect to the rounded end of the needle 115 will be moved farther from the fulcrum 122, thereby causing the mechanical disadvantage on the cam 121 to be less and so providing a safety release at a lower excess pressure. In summary of the above, it may be said that for normal pressure of the pump there is a complete seal in the "line" under "flooded suction" conditions, and that to provide for release of an excessive pressure condition that may be set up, means is provided for this end which is adjustable so that release may occur at any one of a plurality of excessive pressures as circumstances require.

But "flooded suction" conditions are not always maintainable, as is the case when a tank compartment becomes empty before the operator realizes it, and in addition to this just the reverse of "flooded suction" conditions can be brought about from the very start unintentionally or very intentionally, as set forth above. These undesirable conditions arise when air or vapor as well as liquid are allowed to reach the pump P and be churned up thereby, and there will now be set forth the operation of the above-described mechanism which, within a tolerance limit, prevents the froth or foam churned up by the pump from reaching the meter M.

It will be realized that what keeps the float 125 (Fig. 1) up in the chamber portion 149, i. e., that what keeps the needle 115 seated on its seat 113, is the continuous presence of sufficient free liquid in the chamber portion 149, since the float 125 is made too heavy to float in froth or foam. It will also be realized that if a mixture of air or vapor and free liquid are introduced into the chamber 40, the continuous supply of free liquid will be immediately diminished and may become insufficient in amount in the chamber portion 149 to buoy up the float 125 to an extent sufficient to maintain the needle 115 seated. Stated in another way, when sufficient air or vapor as well as liquid are introduced either by gravity or by pump suction into the chamber 40, the float 125 will drop as free liquid in the chamber portion 149 passes to the by-pass casing 68, thereby withdrawing the cam 121 from contact with the needle 115 and thus causing or permitting an easy withdrawal of the needle from its seat 113 so that the free interior of the vented chamber 40, the tube 108, and the portion of the casing chamber 70 above the bottom of the piston cup 93 are in communication. With the float 125 down (Fig. 2) the mixture of air or vapor with liquid will be sucked into the by-pass casing chambers 70 and 74 and into the pump intake 79, and will be forced out from the pressure outlet 80 to the by-pass casing chambers 75 and 71. But by reason of the back pressure set up by the check valves 27 or 37, the froth or foam churned up by the pump will take the course of least resistance, and that course is in part the tube 100 forming a communication between the upper and lower by-pass chambers 70 and 71, respectively, above the bottom of the piston cup 93. Since the tube 108 has an inside diameter greater than that of the tube 100 and now provides an open communication between the top of the upper casing chamber 70 and the interior of the chamber 40, it will be seen that any froth or foam entering the upper casing chamber 70 undergoes a drop in pressure, equalizing any pressure differential that might otherwise exist as between the upper surface of the bottom of the piston cup 93 and the under surface of the valve member 88, and so providing that under the influence of what pressure there is in the lower casing chamber 71 the valve member 88 rises from its seat 87 against the resistance offered by the weak coil spring 95 and so provides that the lower casing chamber 71 and the portion of the upper casing chamber 70 below the bottom of the piston cup 93 are themselves in communication. As the lower casing chamber 71 is in communication with the vented chamber 40 by reason of the tube 100, the portion of the chamber 70 above the bottom of the piston cup 93, the tube 108, and the open or retracted needle 115, and as the casing chamber 71 is in communication with the portion of the upper chamber 70 below the bottom of the piston cup 93, it will be seen that the back pressure set up by the check valves 27 or 37 causes the froth or foam forced by the pump into the lower chamber 71 of the by-pass casing 68 to pass partially to the top of the casing chamber 70 and partially through the frusto-conical seat 87 and into the lower portion of the chamber 70. But since the communication between the lower casing chamber 71 and the vented chamber 40 is mediate, while the communication between the lower casing chamber 71 and the lower portion of the upper casing chamber 70 is immediate and direct, the back pressure set up by the check valves 27 or 37 necessarily causes the greater part of the froth or foam to be by-passed through the frusto-conical seat 87 and back to the inlet 79 of the intake side or portion of the pump by suction so that very little froth or foam passes to the vented chamber 40 at all and less is vented through the pipe 144 since the bubbles of the froth or foam have opportunity to burst by reason of the chamber 40 being at all times vented as opposed to the tendency of the valves in "air releases" or "air eliminators" to become closed and setting up pressure which prevents bubble bursting. By reason of the above-described construction and mode of operation it will therefore be seen that when the float 125 drops, the check valves 27 or 37 and the mechanism associated with the casing 68 causes practically all of the froth or foam to be by-passed into and out of the pump P over and over again by way of the open valve seat 87. As a result, no froth or foam ever reaches the meter M, within a tolerance limit, and consequently the meter does not register as liquid that which is not liquid.

So long as the pump continues to receive air and vapor as well as liquid, the above-described by-passing condition will continue, and this situation will not change until the shut-off valves 21 or 31 connected to empty tank compartments and unintentionally or intentionally open are closed. When, however, this closing takes place, free liquid will again enter the chamber 40 and buoy up the float 125 so that the needle 115 is seated, and once this occurs the communication between the by-pass casing 68 and the chamber 40 becomes closed at the needle 115, and as only free liquid passes to the by-pass casing 68 the pressure differential against the upper face of the bottom of the piston cup 93 and the under face of the valve member 88 will be restored, resulting in the downward or seating movement of the valve member 88 by reason of its connection with the piston. The "line" is thus fully sealed again, and as only liquid is pumped to the meter M, the meter once more registers. Reliance is placed primarily on the restoration of the above pressure differential when normal or "flooded suction" conditions are resumed to effect the downward closing movement of the valve member 88, but because this pressure differential is small, the spring 95 is a desirable adjunct since it positively causes the valve member 88 to seat and effect a seal, a situation that might not always occur, in view of internal conditions in the by-pass casing 68, were the weight of the valve member and associated parts, including the piston cup 93 which frictionally engages the inner wall of the casing 68, relied upon to supplement the pressure differential to effect the descent of the valve member 88. It will also be appreciated that if the occasion for the mixing of air or vapor with the liquid is the emptying of a tank compartment, a point will be reached when there will be neither froth nor foam nor liquid upon which the pump can act, but that before this situation occurs any mixture of air or vapor with liquid reaching the pump P is by-passed away from the meter M in the same manner as set forth above.

In Figs. 10–12 there are shown modified forms of the apparatus set forth above, but the Figs. 10–12 structures involve not only the same fundamental by-passing mode of operation described above but also the use of structure identical with that shown in Figs. 1–9 to such an extent that the reference numerals of the latter figures are applied to the parts in question shown in Figs. 10–12, thereby rendering detailed comment on all the elements of Figs. 10–12 unnecessary. The Figs. 1–9 construction as a whole is intended primarily for use as a unit, including the pump P, so that the construction can be located as a unit as desired, suitable connections being provided to drive the pump or a separate power plant being provided as a part of the unit and functioning for this purpose. The Fig. 10 structure, however, and also that of Fig. 12 for that matter, is intended for use where the above conditions are not feasible or are inconvenient, as when the pump P is already in a given fixed position so that the by-pass construction as a whole must be arranged and located with respect to the pump as a constant. While the arrangement shown in Fig. 10 is primarily intended for use on a tank truck, it need not be so used, as neither need the Figs. 1–9 construction.

Referring to Fig. 10 and also to Fig. 11 for certain details, and bearing in mind that the Fig. 10 construction is intended to accommodate a pump P that is in a permanent location, the nipple 65 at the outlet collar 64 of the chamber 40 is connected to one end of a conduit 150 the opposite end of which extends outwardly beyond the right wall 54 of the chamber 40 and is secured to the inlet collar 151 (identical with the inlet collar 67 in Fig. 1) outwardly extending from a by-pass casing 152. This casing 152 (Fig. 11) is provided with upper and lower chambers 153 and 154, respectively, and with a partition 155 therebetween, corresponding to the upper and lower chambers 70 and 71 and the part of the partition 72 beneath the top of the by-pass casing 68, respectively but instead of utilizing a boss such as 73 (Fig. 1), a boss 156 providing a single passage extends outwardly from the casing 152, and joined to the boss 156 is one end of a conduit 157 which may have any desired length or curvature, the opposite end of this conduit being secured in a hollow boss 158 outstanding from a plate 159, corresponding to the plate 76, and secured to the plate 81 of the pump P in the same manner as shown in Fig. 1. Also outstanding from the plate 159 but located below the boss 158 is a second boss 160, and this second boss receives one end of a jointed conduit 161 provided with an inverted T 162 the upper opening of which receives one end of a bent conduit 163 the opposite end of which is received by the outlet 164 from the lower casing chamber 154.

The jointed conduit 161 is provided with a union 165 to facilitate assembly of parts, and beyond the T 162 a continuation of the conduit 161 comprises a second union 166 suitably secured to the intake end 86 of the meter M. The outlet end 25 of the meter M is connected to a conduit 167 provided with a check valve 168, like the check valves 27 or 37 and functioning in the same way for the same purpose, and the conduit 167 corresponds to the conduit 26 (Fig. 8) or 36 (Fig. 9) and leads to a hose (not shown) in the manner of the conduits 26 or 36. In all other respects save one the embodiment of the present invention shown in Figs. 10 and 11 is structurally and functionally identical with the showing in Figs. 1–9, the one exception being that the tube 169, which corresponds functionally to the tube 108, is shorter than the tube 144 and is therefore given a different reference numeral.

It will be understood, of course, that the bosses 158 and 160 and their associated conduits have a function identical with that of the plate openings 77 and 78 (Fig. 1) and the illustrated casing chambers 70, 74 and 75, 71, respectively, and that while the conduit 157 and the boss 158 are of greater diameter than are the conduit 161 and the boss 160, respectively, thereby corresponding to the differential size of the aligned openings or passages 77—79 and 78—80, respectively, in Fig. 1, the conduits 157 and 161 and the openings in their bosses may be of equal diameter as set forth above in connection with the corresponding structure in Fig. 1.

So far as the operation of the Fig. 10 structure is concerned, it is functionally identical with that shown in Figs. 1–9, there being in this only the difference, so far as structure is concerned, that the pressure side or portion of the pump P is operatively connected to the outlet 164 of the by-pass casing 152 from a point outside the casing. By reason of the check valve 168, however, when the float 125 in the chamber 40 drops to permit the unseating of the valve 115, the upper and lower chambers 153 and 154 of the casing 152 are in mediate communication with the interior of the vented chamber 40 in the same way that the upper and lower chambers 70 and 71 in Fig. 1 are in mediate communication with the chamber 40, with the result that any froth or foam mixed with liquid in the conduit 161 and the T 162 is sucked up through the conduit 163 into the casing chamber 154 and is by-passed back to the pump P by way of the open valve seat 87 and the conduit 157. In view of the foregoing and of the identity of numerous parts in the Figs. 10 and 11 showings as compared to those of Figs. 1–9, it is deemed unnecessary to describe the operation of the Figs. 10 and 11 construction under "flooded suction" conditions, except to say that it is functionally identical, as can be readily seen.

The Fig. 12 illustration is made to show the by-pass construction as a whole associated with a tank or vat V (bulk plant) which may be supported in any desired manner, and also to show that the by-pass casing need not be beneath or at a level below the chamber 40, as is the showing in Figs. 1, 8, 9, and 10. So far as structural differences over these same figures are concerned, the rods 170 of Fig. 12 forming part of the support for the chamber 40 are shorter than the rods 43 but are functionally identical. The nipple 65 at the outlet collar of the chamber 40 is connected to one end of a jointed conduit 171 which extends outwardly and upwardly beyond the right wall 54 of the chamber 40 so that the opposite end of the conduit is suitably secured to the inlet collar 151 of the by-pass casing 152 in the same manner as shown in Figs. 1, 10, and 11. The jointed conduit 172, which may be of any length or height, as is the case with the jointed conduit 171, and which leads from the pressure side or portion of the pump P, is operatively connected to the outlet 164 of the by-pass casing 152 by means of a conduit 173 interposed between the T 162 and the conduit 163. The jointed conduit 172 is provided with the union 165 to facilitate assembly of parts, and forming a continuation of the conduit 172 and leading to the intake end 86 of the meter M is a conduit 174. The outlet end 25 of the meter M is connected to a conduit 175 which carries a check valve 176, like the check valves 27, 37, and 168 and functioning in the same way for the same purpose, and the conduit 175 corresponds to the conduits 26, 36, and 167 and also functions in the same way for the same purpose. For a reason presently to be given the conduit 171 is preferably provided with a check valve 177 which may offer greater resistance than that offered by the check valves 27, 37, 168 and 176. In all other respects the Fig. 12 structure is identical with that shown in Figs. 1–11, as the case may be, except that the tube 178, corresponding functionally to the tubes 108 and 169, is given its own reference numeral since it is shown in Fig. 12 as being of any desired length. In view of the foregoing no further structural description seems necessary, and so far as the mode of operation is concerned, it is fundamentally the same as that of the structure shown in Figs. 1–11.

There are certain points, however, that should be noted in connection with Fig. 12. It will be noticed that the bottom of the valve-controlled outlet 179 from the vat V is slightly higher than the top of the inlet collar 151 outstanding from the by-pass casing 152. By reason of this construction, considering the parts illustrated in Fig. 12 as being located as shown, i. e., as if the various conduits and the tube 178 were not shown broken, it will be seen that liquid emitting from the vat outlet 179 down the conduit 180 can pass into and out of the chamber 40 and so to the by-pass casing 152 by gravity alone, and it will be apparent that the same result is possible if the vat outlet is higher than that shown. By reason of such arrangements a condition of "flooded suction" will always exist until the liquid in the vat V falls below the top of the outlet 179, but when this takes place and continues air or vapor in increasing amounts become mixed with the outflowing liquid and churned up into a froth or foam by the pump P. By reason of the above-described by-pass arrangement, however, including the back pressure set up by the check valve 176, the froth or foam is sucked up the conduits 173 and 163 and so back into the casing 152 and subject to the drawing action of the pump inlet.

If the casing 152 and associated parts be elevated to a point below the level of the liquid in the vat V, the same "flooded suction" condition will exist until the level of the liquid falls below the top of the vat outlet 179, after which the froth or foam churned up in the pump P will be by-passed as set forth above. The same "flooded suction" and by-passing will take place if the casing 152 and associated parts are at a level above that of the liquid in the vat V, but in this case it may be necessary to prime the pump P before it will draw liquid up the conduit 171, and it may be advisable to provide the conduit 171 with the check valve 177 for trapping liquid in the conduit on the opposite sides of the valve 177, thereby insuring that when the pump P, once stopped after operating, is thrown into operation again, the pump will either need no priming at all or much less than might be the case were the check valve 177 absent.

Nothing herein disclosed is to be interpreted as limiting the scope of the present invention to use in connection with the particular apparatus or the particular mode of operation or any combination thereof selected for purposes of explanation and illustration. While the particulars of construction herein set forth are well suited to the mechanical forms of the invention shown, and the uses to which they are put, the present invention is not limited to these uses nor to these mechanical features, nor to the conjoint use of all features.

What is claimed as new is:

1. In a device of the class described, the combination with a chamber provided with an inlet and an outlet and adapted to receive free liquid or mixed gas and liquid by way of the inlet, a pump, passages-providing means one portion of which forms a conduit from the outlet of the chamber for the flow of said free liquid or mixed gas and liquid to the intake side of the pump and another portion of which forms a conduit for the flow of said free liquid or mixed gas and liquid under pressure from the outlet side of the pump, and means actuable to place said conduits in communication with each other so that mixed gas and liquid may be by-passed through the communication by the action of the suction and pressure of the pump, of means controlled by the quantity of free liquid in the chamber for actuating said last named means.

2. In a device of the class described, the combination with a chamber provided with an inlet and an outlet and adapted to receive free liquid or mixed gas and liquid by way of the inlet, a pump, passages-providing means one portion of which forms a conduit from the outlet of the chamber for the flow of said free liquid or mixed gas and liquid to the intake side of the pump and another portion of which forms a conduit for the flow of said free liquid or mixed gas and liquid under pressure from the outlet side of the pump, and means, including a check valve forming a portion of said last named conduit, actuable to place said conduits in communication with each other so that mixed gas and liquid may be by-passed through the communication by the action of the suction and pressure of the pump, of means controlled by the quantity of free liquid in the chamber for actuating said last named means.

3. In a device of the class described, the combination with a chamber provided with an inlet and an outlet and adapted to receive free liquid or mixed gas and liquid by way of the inlet, a pump, passages-providing means one portion of which forms a conduit from the outlet of the chamber for the flow of said free liquid or mixed gas and liquid to the intake side of the pump and another portion of which forms a conduit for the flow of said free liquid or mixed gas and liquid under pressure from the outlet side of the pump, and means actuable to place said conduits in communication with each other so that mixed gas and liquid may be by-passed through the communication by the action of the suction and pressure of the pump, of means, including a float in the chamber and a valve actuable by the float, controlled by the quantity of free liquid in the chamber for actuating said last named means.

4. In a device of the class described, the combination with a chamber provided with an inlet and an outlet and adapted to receive free liquid or mixed gas and liquid by way of the inlet, a pump, passages-providing means one portion of which forms a conduit from the outlet of the chamber for the flow of said free liquid or mixed gas and liquid to the intake side of the pump and another portion of which forms a conduit for the flow of said free liquid or mixed gas and liquid under pressure from the outlet side of the pump, a check valve forming a portion of said last named conduit, and means cooperable with the check valve to place said conduits in communication with each other so that mixed gas and liquid may be by-passed through the communication by the action of the suction and pressure of the pump, of means, including a float in the chamber and a valve actuable by the float, also cooperating with the check valve and controlled by the quantity of free liquid in the chamber for actuating said last named means.

5. In a device of the class described, the combination with a chamber provided with an inlet and an outlet and adapted to receive free liquid or mixed gas and liquid by way of the inlet, a pump, a casing, passages-providing means one portion of which, including a portion of the casing, forms a conduit from the outlet of the chamber for the flow of said free liquid or mixed gas and liquid to the intake side of the pump and another portion of which forms a conduit for the flow of said free liquid or mixed gas and liquid under pressure from the outlet side of the pump, and means, including communication-providing elements in the casing, actuable to place said conduits in communication with each other so that mixed gas and liquid may be by-passed through the communication by the action of the suction and pressure of the pump, of means controlled by the quantity of free liquid in the chamber for actuating said last named means.

6. In a device of the class described, the combination with a chamber provided with an inlet and an outlet and adapted to receive free liquid or mixed gas and liquid by way of the inlet, a pump, a casing, passages-providing means one portion of which, including a portion of the casing, forms a conduit from the outlet of the chamber for the flow of said free liquid or mixed gas and liquid to the intake side of the pump and another portion of which forms a conduit for the flow of said free liquid or mixed gas and liquid under pressure from the outlet side of the pump and means, including a check valve and also communication-providing elements located in the casing, actuable to place said conduits in communication with each other so that mixed gas and liquid may be by-passed through the communication by the action of the suction and pressure of the pump, of means controlled by the quantity of free liquid in the chamber for actuating said last named means.

7. In a device of the class described, the combination with a chamber provided with an inlet and an outlet and adapted to receive free liquid or mixed gas and liquid by way of the inlet, a pump, a casing, passages-providing means one portion of which, including a portion of the casing, forms a conduit from the outlet of the chamber for the flow of said free liquid or mixed gas and liquid to the intake side of the pump and another portion of which forms a conduit for the flow of said free liquid or mixed gas and liquid under pressure from the outlet side of the pump, a check valve forming a portion of said last named conduit, and means, cooperable with the check valve and including communication-providing elements located in the casing, actuable to place said conduits in communication with each other so that mixed gas and liquid may be by-passed through the communication by the action of the suction and pressure of the pump, of means, including a float in the chamber and a valve actuable by the float, also cooperating with the check valve and controlled by the quantity of free liquid in the chamber for actuating said last named means.

8. In a device of the class described, the combination with a chamber provided with an inlet and an outlet and adapted to receive free liquid or mixed gas and liquid by way of the inlet, a pump, a casing, passages-providing means one portion of which, including a portion of the casing, forms a conduit from the outlet of the chamber for the flow of said free liquid or mixed gas and liquid to the intake side of the pump and another portion of which, including a different portion of the casing, forms a conduit for the flow of said free liquid or mixed gas and liquid under pressure from the outlet side of the pump, and means actuable to place said two casing portions in communication with each other so that mixed gas and liquid may be by-passed through the communication by the action of the suction and pressure of the pump, of means controlled by the quantity of free liquid in the chamber for actuating said last named means.

9. In a device of the class described, the combination with a chamber provided with an inlet and an outlet and adapted to receive free liquid or mixed gas and liquid by way of the inlet, a pump, a casing, passages-providing means one portion of which, including a portion of the casing, forms a conduit from the outlet of the chamber for the flow of said free liquid or mixed gas and liquid to the intake side of the pump and another portion of which, including a different portion of the casing, forms a conduit for the flow of said free liquid or mixed gas and liquid under pressure from the outlet side of the pump, and means, including a check valve forming a portion of said last named conduit, actuable to place said two casing portions in communication with each other so that mixed gas and liquid may be by-passed through the communication by the action of the suction and pressure of the pump, of means controlled by the quantity of free liquid in the chamber for actuating said last named means.

10. In a device of the class described, the combination with a chamber provided with an inlet and an outlet and adapted to receive free liquid or mixed gas and liquid by way of the inlet, a pump, a casing, passages-providing means one portion of which, including a portion of the casing, forms a conduit from the outlet of the chamber for the flow of said free liquid or mixed gas and liquid to the intake side of the pump and another portion of which, including a different portion of the casing, forms a conduit for the flow of said free liquid or mixed gas and liquid under pressure from the outlet side of the pump, and means, including a check valve forming a portion of said last named conduit, actuable to place said two casing portions in communication with each other so that mixed gas and liquid may be by-passed through the communication by the action of the suction and pressure of the pump, of means, including a float in the chamber and a valve actuable by the float, controlled by the quantity of free liquid in the chamber for actuating said last named means.

11. In a device of the class described, the combination with a chamber provided with an inlet and an outlet and adapted to receive free liquid or mixed gas and liquid by way of the inlet, a pump, passages-providing means one portion of which forms a conduit from the outlet of the chamber for the flow of free liquid or mixed gas and liquid to the intake side of the pump and another portion of which forms a conduit for the flow of said free liquid or mixed gas and liquid under pressure from the outlet side of the pump, means actuable to place said conduits in communication with each other so that mixed gas and liquid may be by-passed through the communication by the action of the suction and pressure of the pump, and means controlled by the quantity of free liquid in the chamber for actuating said last named means, of means operable to provide a communication between the chamber and one of said conduits so that any mixed gas and liquid not by-passed through the first named communication may pass to said chamber.

12. In a device of the class described, the combination with a chamber provided with an inlet and an outlet and adapted to receive free liquid or mixed gas and liquid by way of the inlet, a pump, passages-providing means one portion of which forms a conduit from the outlet of the chamber for the flow of free liquid or mixed gas and liquid to the intake side of the pump and another portion of which forms a conduit for the flow of said free liquid or mixed gas and liquid under pressure from the outlet side of the pump, means actuable to place said conduits in communication with each other so that mixed gas and liquid may be by-passed through the communication by the action of the suction and pressure of the pump, and means controlled by the quantity of free liquid in the chamber for actuating said last named means, of means, including a valve actuable by said last named means, operable to provide a communication between the chamber and one of said conduits so that any mixed gas and liquid not by-passed through the first named communication may pass to said chamber.

13. In a device of the class described, the combination with a chamber provided with an inlet and an outlet and adapted to receive free liquid or mixed gas and liquid by way of the inlet, a pump, passages-providing means one portion of which forms a conduit from the outlet of the chamber for the flow of free liquid or mixed gas and liquid to the intake side of the pump and another portion of which forms a conduit for the flow of said free liquid or mixed gas and liquid under pressure from the outlet side of the pump, means actuable to place said conduits in communication with each other so that mixed gas and liquid may be by-passed through the communication by the action of the suction and pressure of the pump, and means controlled by the quantity of free liquid in the chamber for actuating said last named means, of means operable to provide a communication between the chamber and one of said conduits so that any mixed gas and liquid not by-passed through the first named communication may pass to said chamber, said chamber being provided with a vent to permit the escape of said gas.

14. The combination with a vented, liquid-holding tank having outlet means, of a chamber separate from the tank, said chamber being provided with an inlet and an outlet and being adapted to receive by way of its inlet free liquid or mixed gas and liquid from the tank outlet means, a pump, passages-providing means one portion of which forms a conduit from the outlet of the chamber for the flow of said free liquid or mixed gas and liquid to the intake side of the pump and another portion of which forms a conduit for the flow of said free liquid or mixed gas and liquid under pressure from the outlet side of the pump, means actuable to place said conduits in communication with each other so that mixed gas and liquid may be by-passed through the communication by the action of the suction and pressure of the pump, and means controlled by the quantity of free liquid in the chamber for actuating said last named means.

15. The combination with a tank truck provided with at least one vented, liquid-holding compartment having outlet means, of a chamber separate from the compartment, said chamber being provided with an inlet and an outlet and being adapted to receive by way of its inlet free liquid or mixed gas and liquid from the compartment outlet means, a pump, passages-providing means one portion of which forms a conduit from the outlet of the chamber for the flow of said free liquid or mixed gas and liquid to the intake side of the pump and another portion of which forms a conduit for the flow of said free liquid or mixed gas and liquid under pressure from the outlet side of the pump, means actuable to place said conduits in communication with each other so that mixed gas and liquid may be by-passed through the communication by the action of the suction and pressure of the pump, and means controlled by the quantity of free liquid in the chamber for actuating said last named means.

16. Structure such as set forth in claim 15 characterized by the fact that there is the provision of means for supporting the chamber, the passages-providing means, and the actuable and actuating means as a unit upon the tank truck.

17. In a device of the class described, the combination with a chamber provided with an inlet and an outlet and adapted to receive free liquid or mixed gas and liquid by way of the inlet, a pump, passages-providing means one portion of which forms a conduit from the outlet of the chamber for the flow of said free liquid or mixed gas and liquid to the intake side of the pump and another portion of which forms a conduit for the flow of said free liquid or mixed gas and liquid under pressure from the outlet side of the pump, and means for by-passing mixed gas and liquid from said last named conduit to said first named conduit by the action of the suction and pressure of the pump, of means operative while said by-passing means is inoperative for returning to the chamber free liquid from said last named conduit upon the production of excessive pressure by the pump, said last named means including a fluid pressure responsive valve having an operative connection with said last named conduit and controlled through said operative connection by excessive pressure of the liquid in said last named conduit.

18. In a device of the class described, the combination with a chamber provided with an inlet and an outlet and adapted to receive free liquid or mixed gas and liquid by way of the inlet, a pump, passages-providing means one portion of which forms a conduit from the outlet of the chamber for the flow of said free liquid or mixed gas and liquid to the intake side of the pump and another portion of which forms a conduit for the flow of said free liquid or mixed gas and liquid under pressure from the outlet side of the pump, means for by-passing mixed gas and liquid from said last named conduit to said first named conduit by the action of the suction and pressure of the pump, and means operative while said by-passing means is inoperative for returning to the chamber free liquid from said last named conduit upon the production of excessive pressure by the pump, said last named means including a fluid pressure responsive valve having an operative connection with said last named conduit and controlled through said operative connection by excessive pressure of the liquid in said last named conduit, of means supported from the chamber and cooperable with said valve for causing it to open at any one of a plurality of different excessive pressures.

19. In a device of the class described, the combination with a chamber provided with an inlet and an outlet and adapted to receive free liquid or mixed gas and liquid by way of the inlet, a pump, passages-providing means one portion of which forms a conduit from the outlet of the chamber for the flow of said free liquid or mixed gas and liquid to the intake side of the pump and another portion of which forms a conduit for the flow of said free liquid or mixed gas and liquid under pressure from the outlet side of the pump, means for by-passing mixed gas and liquid from said last named conduit to said first named conduit by the action of the suction and pressure of the pump, and means operative while said by-passing means is inoperative for returning to the chamber free liquid from said last named conduit upon the production of excessive pressure by the pump, said last named means including a fluid pressure responsive valve having an operative connection with said last named conduit and controlled through said operative connection by excessive pressure of the liquid in said last named conduit, of means for causing said valve to open at any one of a plurality of different excessive pressures, said last named means being cooperable with said valve and including a member engageable with said valve and movable from one engagement position to any one of a plurality of engagement positions with respect to said valve.

20. In a device of the class described, the combination with a chamber provided with an inlet and an outlet and adapted to receive free liquid or mixed gas and liquid by way of the inlet, a pump, a casing, passages-providing means one portion of which, including a portion of the casing, forms a conduit from the outlet of the chamber for the flow of said free liquid or mixed gas and liquid to the intake side of the pump and another portion of which, exclusive of any portion of the casing interior, forms a conduit for the flow of said free liquid or mixed gas and liquid under pressure from the outlet side of the pump, and means, including elements in the casing and a communication between the interior of the casing and said last named conduit portion, operable for by-passing mixed gas and liquid through the casing by the action of the suction and pressure of the pump, of means controlled by the quantity of free liquid in the chamber for actuating said operable means.

EDWARD G. MOODY.